United States Patent [19]

Kurematsu et al.

[11] Patent Number: 5,101,279
[45] Date of Patent: Mar. 31, 1992

[54] LIQUID CRYSTAL DISPLAY APPARATUS HAVING LENTICULAR ELEMENTS ORIENTED IN RELATION TO LC PIXEL APERTURE DIMENSIONS

[75] Inventors: Katsumi Kurematsu, Kawasaki; Nobuo Minoura, Yokohama, both of Japan

[73] Assignee: Canon Kabushiki Kaisha, Tokyo, Japan

[21] Appl. No.: 625,973

[22] Filed: Dec. 11, 1990

[30] Foreign Application Priority Data

Dec. 14, 1989 [JP] Japan .................................. 1-322485
Feb. 22, 1990 [JP] Japan .................................. 2-39759

[51] Int. Cl.$^5$ ............................................. H04N 5/72
[52] U.S. Cl. .................................... 358/241; 359/40; 359/623
[58] Field of Search ............... 358/231, 232, 236, 241, 358/250–253; 350/356, 431, 433, 167; 340/78 A

[56] References Cited

U.S. PATENT DOCUMENTS

| | | | |
|---|---|---|---|
| 4,686,519 | 8/1987 | Yoshida et al. .................. | 350/167 X |
| 4,807,978 | 2/1989 | Grinberg et al. ................ | 350/167 X |
| 4,843,381 | 6/1989 | Baron .................................. | 340/784 |
| 4,957,351 | 9/1990 | Shioji et al. ...................... | 350/167 X |

*Primary Examiner*—James J. Groody
*Assistant Examiner*—Mark R. Powell
*Attorney, Agent, or Firm*—Fitzpatrick, Cella, Harper & Scinto

[57] ABSTRACT

A display apparatus has a display device such as a liquid crystal display device having a plurality of optical-switching portions arranged in the form of an array having longitudinal rows and transverse rows, with each optical-switching portion having a longitudinal dimension and a transverse dimension directions, and the longitudinal dimension and transverse dimension being different distances. A lenticular lens sheet is disposed on one side of the display device such that longitudinal axes of cylindrical lenses comprising the lenticular lens sheet extend in the direction of the optical-switching portion dimension of greater distance, and each cylindrical lens corresponds to one of the longitudinal or transverse rows of the optical switching portions with a dimension having the greater distance.

26 Claims, 8 Drawing Sheets

LIQUID CRYSTAL DISPLAY APPARATUS HAVING LENTICULAR ELEMENTS ORIENTED IN RELATION TO LC PIXEL APERTURE DIMENSIONS

BACKGROUND OF THE INVENTION

1. Field of the Invention

The present invention relates to a display apparatus and, more particularly, to a display apparatus which is suitable for use in a projection type image receiving system and which makes use of an electro-optical response effect produced by a liquid crystal.

2. Description of the Related Art

Hitherto, a display apparatus has been used in which a liquid crystal device has a plurality of liquid crystal-photo switch elements arranged in the longitudinal and transverse directions so as to form a matrix. The liquid crystal device also incorporates various components such as thin film transistors (TFT) for driving liquid crystal-photo switching elements, wiring patterns and storage capacitors. The ratio of the open area of the photo-switching portion to the total area of the element, therefore, is not 100% but is generally 50 to 70%. This ratio will be referred to as "aperture ratio" hereinafter. Consequently, a problem is encountered in that the rate of usage of the incident light is lowered in accordance with a reduction in the aperture ratio. In general, the greater the aperture ratio, the brighter the display. This problem is particularly serious in a projection type image receiving system because this type of system requires a large quantity of light for projecting an image on a greater scale. Minimizing loss of light, therefore, is a critical requirement in this type of apparatus.

SUMMARY OF THE INVENTION

Accordingly, an object of the present invention is to provide a novel display apparatus which is improved to provide a higher rate of usage of the light.

Another object of the present invention is to provide a novel display apparatus which is suitable for displaying an enlarged projected image with a higher level of brightness.

In accordance with on aspect of Applicant's invention, a display apparatus comprises a display device including a plurality of optical-switching portions each having a longitudinal dimension and a transverse dimension, with the longitudinal dimension and transverse dimension being different distances. The display device also has means for controlling the quantity of emitted light with respect to a quantity of incident light by utilizing an electro-optical response effect of a liquid crystal. A lenticular lens sheet having a plurality of cylindrical lenses, with longitudinal axes, is disposed on one side of the display device and is oriented such that the axes extend in the direction of the optical-switching portion dimension having the greater distance.

In accordance with another aspect of Applicant's invention, a display apparatus comprises a display device having first and second sides and including a plurality of optical-switching portions arranged in an array having longitudinal rows and transverse rows, with each optical-switching portion having a longitudinal dimension and a transverse dimension and the longitudinal dimension and transverse dimension being different distances. The display device also has means for controlling the quantity of emitted light with respect to a quantity of incident light by utilizing an electro-optical response effect of a liquid crystal. A first lenticular lens sheet is disposed on the first side of the display device and has convex cylindrical lenses having longitudinal axes. The first lens sheet is oriented such that the axes extend in the direction of the optical-switching portion dimension having the greater distance and each cylindrical lens corresponds to either one of the longitudinal and transverse rows of the optical-switching portions having a dimension o greater distance. In addition, a second lenticular lens sheet, having a plurality of cylindrical convex lens, is provided on the second side of the display device opposite to the first lenticular lens sheet.

DESCRIPTION OF THE PREFERRED EMBODIMENTS

In the display apparatus of the present invention, the optical-switching portion (referred to also as "opening") of a liquid crystal display device has such a geometrical anisotropy that the aperture ratio in the longitudinal direction and the aperture ratio in the transverse direction are different from each other, and this liquid crystal display device is combined with a lenticular lens sheet such that the direction of the axes of the cylindrical lenses constituting the lenticular lens extend in the same direction as the direction of the greater aperture ratio of the photo-switching portion. According to this arrangement, the cylindrical lenses of the lenticular lens sheet effectively converge the illuminating light to the opening so that the rate of utilization of light is remarkably improved as compared with known display apparatus having the same rate of opening.

The invention will be more fully understood from the following description.

Figure 1:
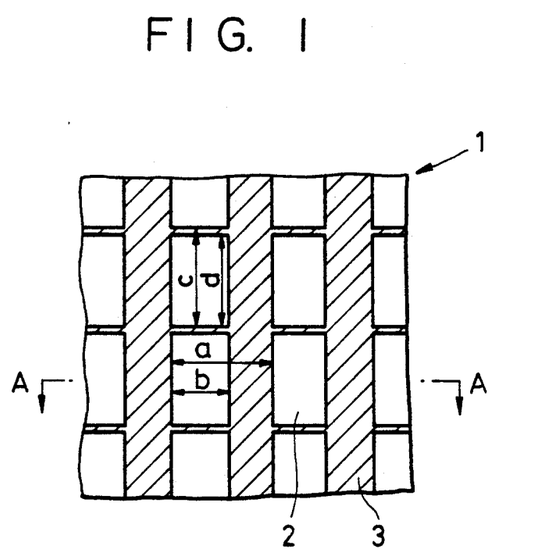
FIG. 1 is a schematic plan view of an embodiment of the liquid crystal display apparatus in accordance with the present invention.
Figure 2:
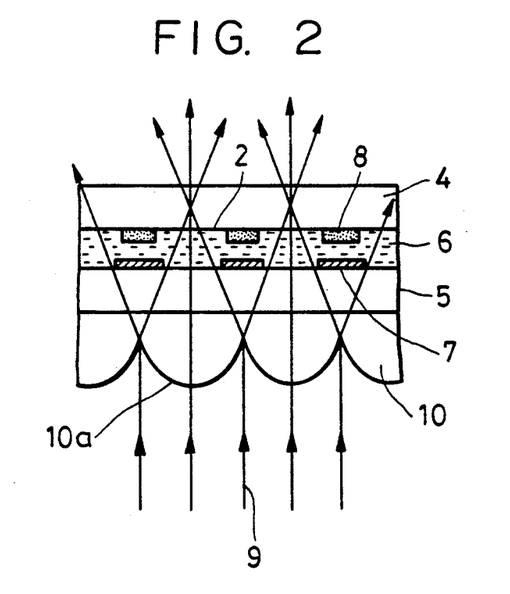
FIG. 2 is a sectional view taken along the line A—A of FIG. 1.

FIG. 1 is a schematic plan view of an embodiment of the display apparatus of the present invention, while FIG. 2 is a sectional view taken along the line A—A of FIG. 1. The display apparatus comprises a liquid crystal device (LCD) which has a photo-switching portion (also known as an opened portion), i.e., apertures, denoted by 2 and non-apertured portions denoted by 3. The liquid crystal liquid crystal or a ferroelectric chiral smectic liquid crystal. The apertures 2 are arranged at a transverse pitch a and a longitudinal pitch c. Each aperture 2 has a width b and a length d. In this liquid crystal display device, therefore, the aperture ratio is expressed as b,d/a.c. In the illustrated case, this ratio is about 50%.

The ratio b/a is defined as the transverse line aperture ratio, while the ratio d/c is defined as the longitudinal line aperture ratio. The illustrated liquid crystal display device 1 is designed such that the longitudinal line aperture ratio (d/c) is greater than the transverse line aperture ratio (b/a) and that the longitudinal line aperture ratio (d/c) is maximized. More specifically, the apertures 2 are formed with such geometrical anisotropy that the ratio d/c is about 90%, while the ratio b/a is about 60%.

Referring now to FIG. 2, the liquid crystal display device 1 has glass substrates 4, 5, a liquid crystal layer 6, black masks 7 providing the non-apertured portion, thin-film transistors (TFT) 8, and a lenticular lens sheet 10. The lenticular lens sheet 10 is bonded to the surface of the glass substrate 5 such that the axes of cylindrical lenses 10a extend in the longitudinal direction of the device, i.e., in the direction of the greater line aperture ratio d/c, so that the lens effect is produced in the transverse direction of the device. The cylindrical lenses 10a of the lenticular lens sheet 10 are arranged at the same pitch as the transverse pitch a of the apertures 2, such that the axes of the lenses 10a are aligned with the centers of the corresponding apertures of the liquid crystal display device 1.

Therefore, when a telecentric illuminating light 9 is applied to the liquid crystal device 1, the light 9 is converged to the apertures 2 by the condensing effect produced by the cylindrical lenses 10a of the lenticular lens sheet 10. In this embodiment, therefore, all portions of the light 9 is utilized in the display on the liquid crystal display device 1, regardless of at least the transverse line aperture ratio of the liquid crystal display device 1. The light condensing effect, however, is not produced in the longitudinal direction, so that the rate of utilization of the light is determined by the longitudinal line aperture ratio (d/c) alone.

In this LCD 1, a large light utilization rate around 90% could be attained in conformity of the longitudinal line aperture ratio d/c which is near 90%, although the area aperture ratio b.d/a.c is as small as 50%.

Figure 3:
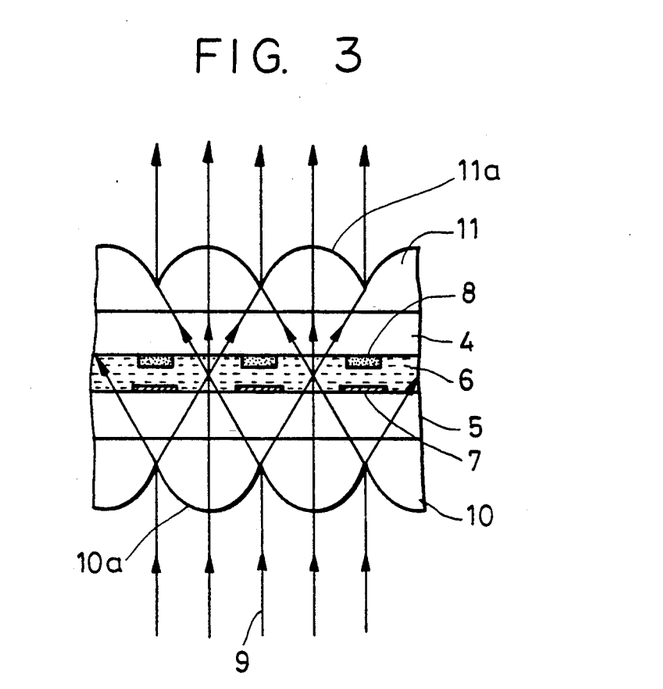
FIGS. 3 to 5 are fragmentary sectional views of another embodiment of the liquid crystal display device of the present invention.

FIG. 3 shows a fragmentary sectional view of another embodiment of the liquid crystal device 1. This embodiment employs a pair of lenticular lens sheet 10 and 11 which are arranged in symmetry with each other and bonded to the glass substrates 4 and 5 of the liquid crystal display device 1. The pattern of arrangement of the apertures are the same as that in the apparatus shown in FIG. 2. The pitch of the cylindrical lenses 10a, 11a of the lenticular lens sheets 10, 11, respectively, as well as the position of these sheets, is exactly the same as that in the apparatus of FIG. 2. The cylindrical lenses 10a and 11a have a focal length which is equal to half the distance between the lenticular sheets 10 and 11. Thus, the lenticular sheet 10 and the lenticular sheet 11 have exactly the same specifications and are arranged in a plane-symmetrical relation to each other. When a telecentric light 9 is applied to the liquid crystal device 1, the beams of the light are converged to the portions of the liquid crystal layer on the enters of the apertures 2 through the lenticular lens sheet 10. The light beams then cross one another at the thicknesswise center of the liquid crystal layer 6 and are made incident to the lenticular lens sheet 11 so as to cross one another and emit in the form of the initial telecentric light.

In this embodiment, as in the case of the embodiment shown in FIG. 2, a large rate of utilization of light is attained regardless of the transverse line aperture ratio, by virtue of the large line aperture ratio in the longitudinal direction.

The liquid crystal display device 1 of the invention can be used in various manners. The embodiment shown in FIG. 3 is particularly suitable for those apparatus in which telecentric light emission is preferred as in the case of a projector.

The embodiments described in connection with FIGS. 2 and 3 are only illustrative and may be modified in the following manners.

(1) The apertures are arranged to have a greater line aperture ratio in the transverse direction and the lenticular lens sheet or sheets are arranged such that the axes of the cylindrical lenses extend in the transverse direction.

Figure 4:
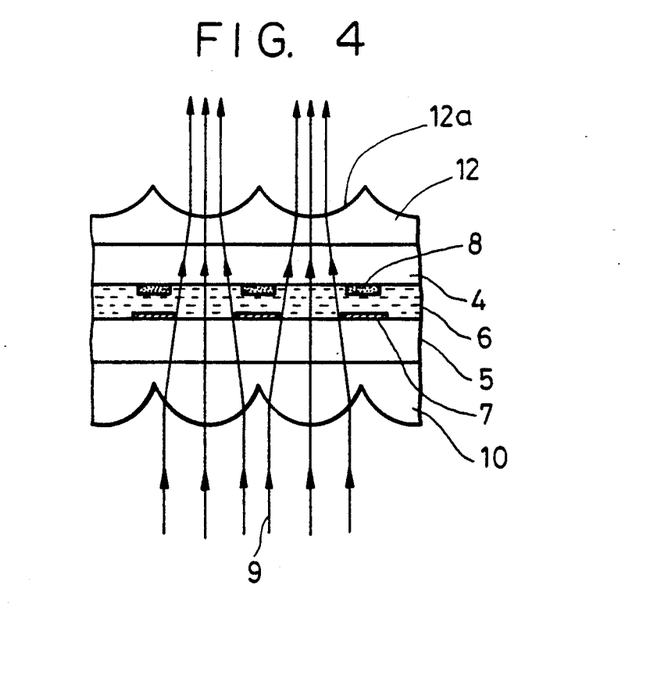

(2) A lenticular lens sheet 12 with concave cylindrical lenses 12a is used on the light-emitting side of the device as shown in FIG. 4 so as to obtain telecentric light or diverging light at the light-emitting side of the liquid crystal display device.

Figure 5:
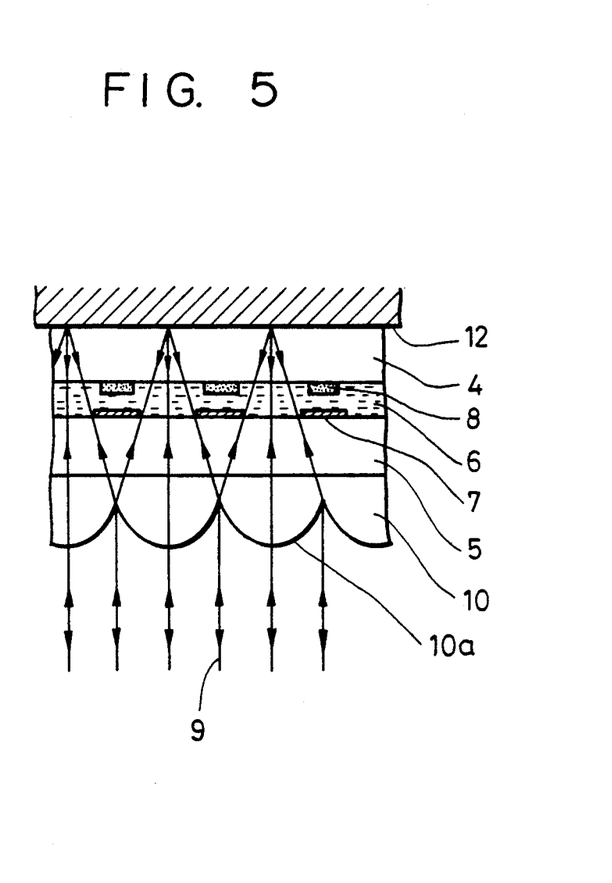

(3) The liquid crystal display device is used in combination with a reflective mirror 13 as shown in FIG. 5 such that the focal points of the cylindrical lenses 10a are positioned on the surface of the reflective mirror 13, so that telecentric light is emitted when a telecentric light is made incident to the liquid crystal display device.

Figure 13:
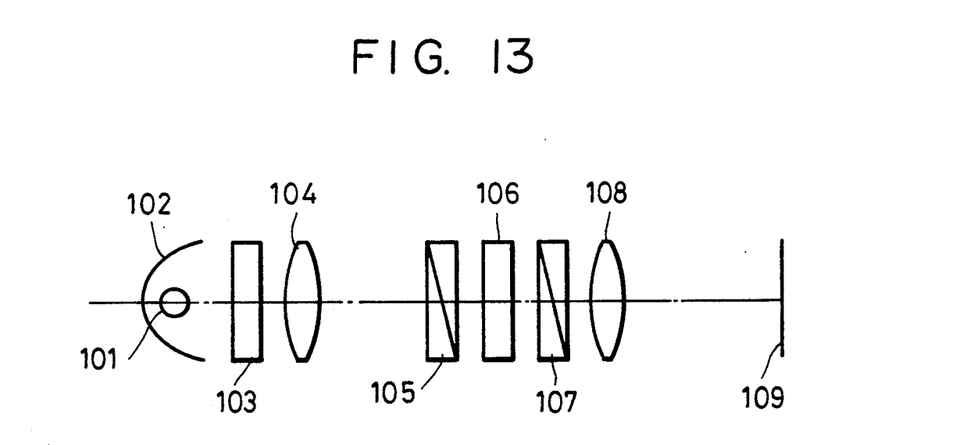
FIG. 13 is an illustration of a critical portion of a known projection type image receiving system.
Figure 14:
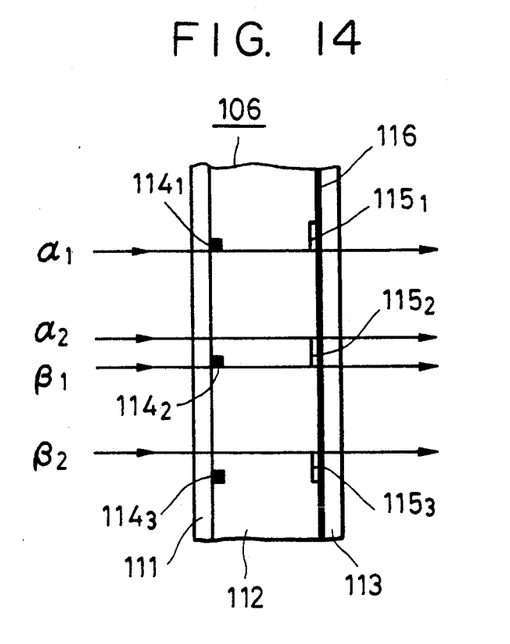
FIG. 14 is a sectional side elevational view of a light-transmission type liquid crystal display apparatus incorporated in the system shown in FIG. 13.
Figure 15:
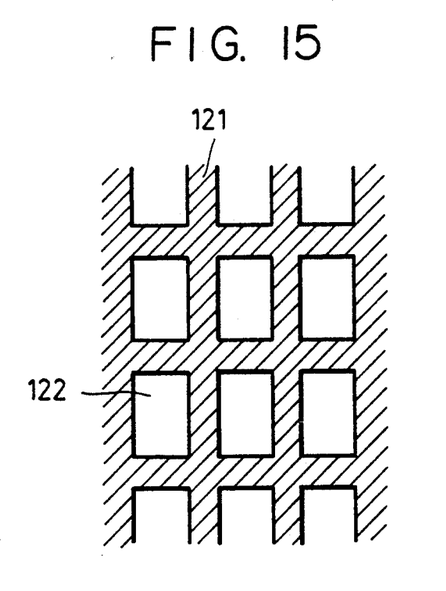
FIG. 15 is an illustration of the aperture ratio of the light transmission type liquid crystal display apparatus 106 shown in FIG. 14.

FIG. 13 shows a critical portion of a known projection type image receiving system incorporating a light-transmission type liquid crystal display device 106. FIG. 15 is an illustration of the apertures of the light-transmission type liquid crystal display device 106 which is shown in FIG. 14 and which is incorporated in a projection type image receiving system shown in FIG. 13. The projection type image receiving system shown in FIG. 13 has a light source 101 including a halogen lamp, a metal halide lamp or the like, a mirror 102 for reflecting part of the light emitted from the light source 101, a heat rays cut filter 103 for absorbing or reflecting heat rays in the light which is received directly from the light source 101 or through the mirror 102, a condenser lens 104 for collimating the light after the removal of the heat ray components into a parallel light beam, a polarizing plate 105 for converting the light beam into linearly polarized light, the liquid crystal display apparatus 106 mentioned above capable of modulating the linearly polarized light in accordance with the image signal, a polarizing plate 107 for transmitting only the axial component of the modulated linearly polarized light, and a projection lens 108 for projecting the transmitted linearly polarized light into a screen 109.

The transmission type liquid crystal display apparatus 106 is driven by thin film transistors (TFT). As shown in FIG. 14, the transmission type liquid crystal display system has a layer of liquid crystal 112 sandwiched between a first glass substrate 111 which is on the incident side and a second glass substrate 113 which is on the light emitting side. In order to enhance the contrast of the displayed image, a black matrix having components $114_1$ to $114_3$ is provided on the surface of the first glass substrate 111 adjacent to the liquid crystal layer 112. Although not shown, a common electrode and color filters of red, green and blue are provided on the surface of the first glass substrate 111. Mutually insulated line electrodes $115_1$ to $115_3$ and mutually insulated column electrodes 116 are periodically formed on the surface of the second glass substrate 113 adjacent to the liquid crystal layer 112. Thin film transistors TFT and auxiliary capacitors, which are used for driving the liquid crystal layer 112, are provided on the points where the line and column electrodes intersect each other.

In this light-transmission type liquid crystal display apparatus 106, therefore, the linearly polarized light incident to the first glass substrate 111 is partially interrupted in the columnar or vertical direction by the wiring pattern of the line electrodes $115_1$ to $115_3$ and in the line or horizontal direction by the wiring pattern of the column electrodes 116. More particularly, in regard to the vertical direction, the rays between rays $\alpha_1$ and $\alpha_2$ or between rays $\beta_1$ and $\beta_2$) are allowed to reach the second glass substrate 113 so as to be emitted therefrom, but the rays between the rays $\alpha_2$ and rays $\beta_1$ are not emitted from the second glass substrate 113 because they are interrupted by the line electrode $115_2$.

In consequence, the linearly polarized light which is transmitted through this light transmission type liquid crystal display apparatus 106 has distribution in which non-transmitting region 121 (hatched in FIG. 15) and transmitting region 122 alternatingly appear both in the vertical or longitudinal direction and horizontal or transverse direction as shown in FIG. 15. Thus, the light transmission type liquid crystal display apparatus 106 has apertures arranged both in the longitudinal and transverse directions.

The aperture ratio, i.e., the ratio of the area of the transmitting region 122 to the entire area of the apparatus 106, is obviously smaller than 100%. Consequently, the projection type image receiving system having the described light transmission type liquid crystal display apparatus 106 has suffered from various disadvantages due to presence of the non-transmitting region 121, such as generation of a mosaic pattern in the image projected on the screen 109, and generation of moire due to difference in the pitch between the mosaic pattern and a Fresnel lens or a double-lenticular lens which forms the screen 109.

In order to overcome these problems, the light transmission type liquid crystal display apparatus of the present invention has a first lenticular lens which is provided on the light incident side of the apparatus. The first lenticular lens sheet has lens elements which are arranged at a pitch equal to at least one of the longitudinal and transverse pitches of the apertures such that each lens element can converge the light to the area of the corresponding aperture. The display apparatus may also be provided with a second lenticular lens sheet U provided on the light-emitting side thereof. The second lenticular lens sheet has lens elements arranged at the same pitch as that in the first lenticular lens sheet so that each lens element receives the converged light from a corresponding aperture so as to emit the light as a diffused light or parallel light beam.

The display apparatus also may be designed such that a lenticular lens provided on the light-emitting side thereof, the lenticular lens having lens elements arranged at a pitch which is equal to at least one of the longitudinal and transverse pitches of the apertures such that each lens element can diffuse parallel light beams received from the corresponding aperture.

In the light transmission type liquid crystal display apparatus of the present invention, the parallel beams of incident light are converged to the areas of the apertures by the first lenticular lens sheet so as not to be interrupted by the components such as the black matrix, line and column electrodes, thin film transistors and auxiliary capacitors. The light emitted form each aperture is refracted by the corresponding lens element of the second lenticular lens sheet so as to be emitted as a diffused light or a parallel light beam. Consequently, the shadow portions in the emitted light is reduced or completely eliminated, thus attaining an improvement in the apparent aperture ratio.

A similar effect is obtained when a lenticular lens sheet is provided on the light emitting side of the display apparatus such that the incident parallel light beam from each aperture is emitted as a diffused light from a corresponding lens element of the second lenticular lens sheet.

The projection type image receiving system employing the liquid crystal display apparatus of the present invention can effectively reduce or eliminate mosaic pattern and, hence, Moire, because the apparent aperture ratio of the liquid crystal display apparatus is remarkably increased by virtue of the fact that a greater portion of the incident light can reach the light-emitting side of the apparatus than in the known display apparatus.

Further embodiments of the invention will be described hereinunder.

Figure 6:
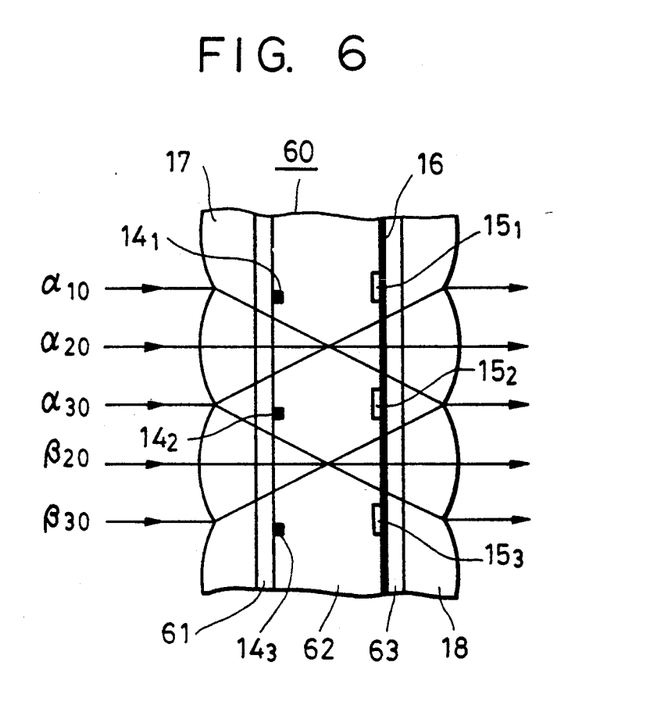
FIG. 6 is a sectional side elevational view of a critical portion of a light-transmission type liquid crystal display apparatus which is still another embodiment of the present invention.
Figure 7:
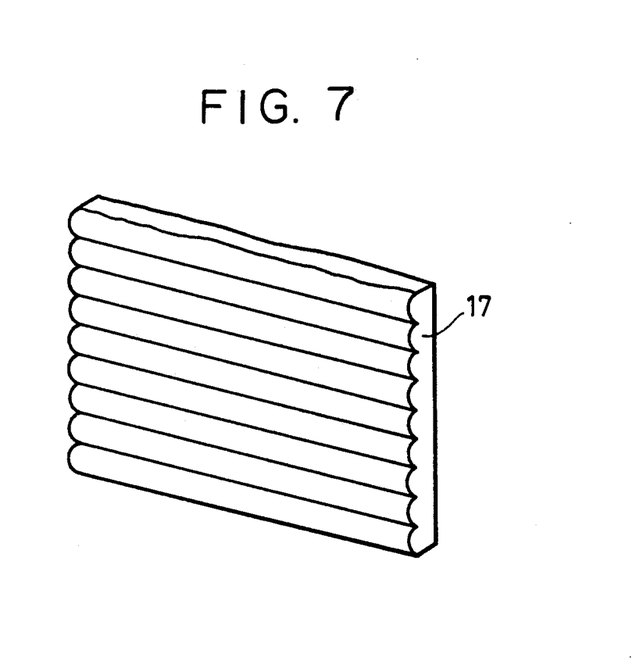
FIG. 7 is a schematic illustration of a lenticular lens sheet used in the embodiment shown in FIG. 7.
Figure 8:
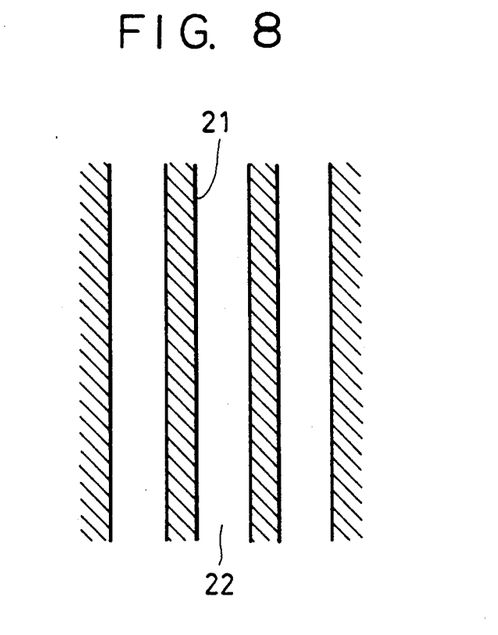
FIG. 8 is an illustration of the aperture ratio of the light-transmission type liquid crystal display 6 shown in FIG. 6.

FIG. 6 is a sectional side elevational view of a light transmission type liquid crystal display apparatus embodying the present invention. FIG. 7 is a schematic illustration of a lenticular lens sheet incorporated in the embodiment shown in FIG. 6. FIG. 8 is an illustration of the apertures in the embodiment shown in FIG. 6.

The light transmission type liquid crystal display apparatus 60 is different from the apparatus 106 shown in FIG. 14 in the following points. Namely, the display apparatus 60 has a first lenticular lens sheet 17 which has, as shown in FIG. 7, a plurality of cylindrical convex lens elements aligned vertically. The first lenticular lens sheet 17 is bonded to the outer surface of the first glass substrate 61, i.e., the surface opposite to the liquid crystal layer 62, such that the cylindrical surfaces of the convex lenses are directed toward the light source. In addition, a second lenticular lens sheet 18, having the same shape as the first lenticular lens sheet 17, is bonded to the surface of the second glass substrate 63 such that the cylindrical convex lens surfaces form a light emitting surface of the apparatus. The cylindrical lenses of the first and second lenticular lens sheets 17 and 18 are arranged at a pitch which is the same as the pitch of the line electrodes $15_1$ to $15_3$, i.e., the vertical or longitudinal pitch of the apertures. In addition, the first and the second lenticular lens sheets 17 and 18 are bonded to the respective glass substrates 61 and 63 such that the valleys between adjacent cylindrical lenses are aligned with the line electrodes $15_1$ to $15_3$, as shown in FIG. 6. Furthermore, the curvature of each cylindrical lens of the lenticular lens sheets 17, 18 is determined such that linearly polarized lights, i.e., lights $\alpha_{10}$ and $\alpha_{30}$, incident to the valleys on both sides of each lens of the first lenticular lens sheet 17 cross each other within the liquid crystal layer 62 and reach opposite ends, i.e., valleys, of the corresponding cylindrical lens of the second lenticular lens sheet.

Consequently, linearly polarized lights incident to the display apparatus 60, represented by $\alpha_{10}$, $\alpha_{20}$, $\alpha_{30}$ and $\beta_{20}$ and $\beta_{30}$, are refracted by the cylindrical lenses of the first lenticular lens sheet 17 so as to be converged to the areas of the corresponding apertures, so that they can reach the second lenticular lens sheet 18 on the light-emitting side, without being interrupted by the non-transmitting regions such as the black matrix components $14_1$ to $14_3$, line electrodes $15_1$ to $15_3$, TFTs (not shown) and auxiliary capacitors (not shown). The light from each aperture is then refracted again by the corresponding cylindrical lens of the second lenticular lens sheet so that transmitted lights are emitted as parallel beams of linearly polarized lights. The first lenticular lens sheet 17, however, cannot refract the lights in the direction parallel to the axes of the cylindrical lenses forming this lenticular lens sheet. Consequently, the incident lights are partially interrupted by the wiring pattern of the column electrodes 16. However, since non-transmitted region 21 does not appear in the vertical direction, i.e,. since the periodic non-transmitted region appears only in the horizontal direction as shown in FIG. 8, the area of the transmitted region 22 is increased to provide a greater aperture ratio than in the conventional apparatus shown in FIG. 15.

In general, television signals have predetermined numbers of scanning lines. For instance, a television signal of NTSC type system has 525 scanning lines. Therefore, improvement in the image quality has been conducted mainly by increasing the number of pixels in the horizontal direction so as to provide a resolution in the horizontal direction. The components which interrupt the lights, e.g., the TFTs and the auxiliary capacitors, can be formed in the intermediate areas between adjacent apertures which are spaced in the vertical direction, so that the horizontal pitch of the apertures, i.e., the pitch of the column electrodes 16, can be minimized to improve the resolution in the horizontal direction. Therefore, a remarkable improvement in the quality of the displayed image can be obtained by elimination of the non-transmitted region in the vertical direction as in the described embodiment.

Figure 9:
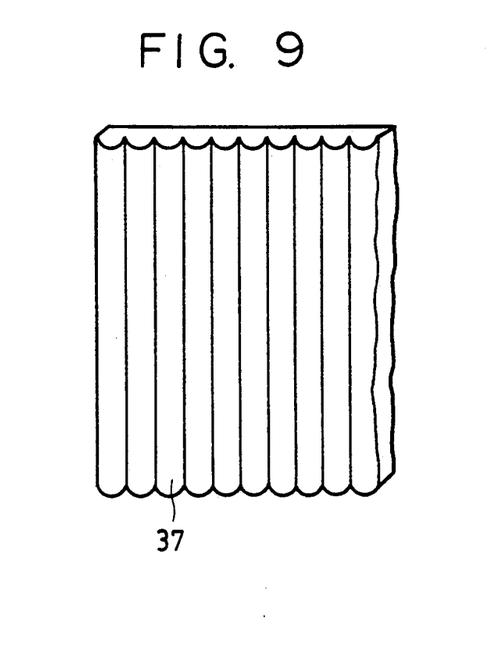
FIG. 9 is a schematic illustration of a first lenticular lens sheet used in still another embodiment of the light-transmission type liquid crystal display device of the present invention.
Figure 10:
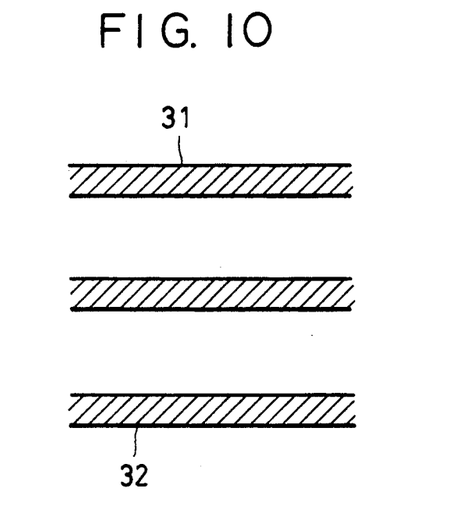
FIG. 10 is an illustration of the aperture ratio in a further embodiment of the present invention.

FIG. 9 is a schematic illustration of the first lenticular lens sheet 37 used in another embodiment of the light transmission type liquid display apparatus of the present invention, while FIG. 10 is an illustration of the aperture ratio of this embodiment.

The light transmission type liquid crystal display apparatus 60 of this embodiment is different from the apparatus shown in FIG. 6 in the following points. The first lenticular lens sheet 37, bonded to the first glass substrate, has cylindrical convex lenses aligned horizontally as schematically shown in FIG. 9. The second lenticular lens sheet bonded to the second glass substrate has the same configuration as the first lenticular lens sheet shown in FIG. 9. The pitch of the cylindrical lenses of these lenticular lens sheets is equal to the pitch of the column electrodes 16, i.e., the horizontal or transverse pitch of the apertures. The valleys between adjacent cylindrical lenses in both lenticular lens sheets are aligned with the column electrodes 16.

Therefore, parallel beams of linearly polarized light are refracted by the cylindrical lenses of the first lenticular lens sheet 37 so as to be converged to the areas of the apertures and can reach the second lenticular lens sheet without being interrupted by the black matrix, wiring pattern of the column electrode, TFT and the auxiliary capacitors. The lights from the respective apertures are then refracted by the second lenticular lens sheet so as to b emitted in the form of parallel beams of linearly polarized light. The first lenticular lens 37, however, does not refract the lights in the vertical direction, so that the incident lights are partially interrupted by the wiring pattern of the line electrodes 15. Consequently, the lights emitted from the light transmission type liquid crystal display apparatus 60 exhibit such a distribution pattern that the non-transmitted region 31 does not appear in the horizontal direction, as will be seen from FIG. 10. Thus, the area of the transmitted region 32 is increased to provide a greater value of the aperture ratio.

In this embodiment, the non-transmitted region regularly appears in the vertical direction. This, however, does not cause any substantial problem because dark stripes in the displayed image are not so noticeable.

In a different embodiment of the invention, each of the first and second lenticular lens sheets is substituted by a double lenticular lens sheet formed by bonding together the lenticular lens sheet 17 of FIG. 7 and the lenticular lens sheet 37 of FIG. 9 or by a fly-eye lenticular lens sheet produced by forming these lenticular lens sheets 17 and 37 integrally. These lenticular lens sheets are bonded to the first and second glass substrates, respectively. As will be obviously understood from the foregoing description taken in conjunction with FIGS. 8 and 10, this arrangement provides a large aperture ratio which approximates 100%.

Figure 11:
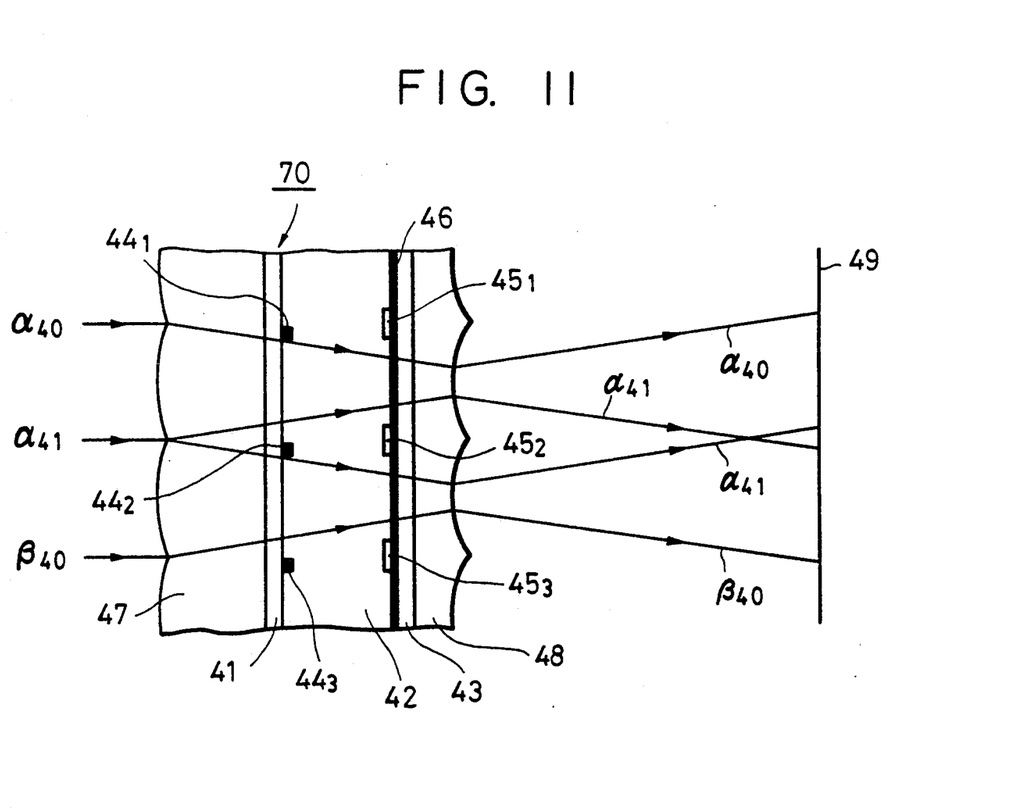
FIG. 11 is a sectional side elevational view of a further embodiment of the light-transmission type liquid crystal display apparatus of the present invention, showing particularly a critical portion of the embodiment.

FIG. 11 is a sectional side elevational view of a different embodiment of the present invention.

In the light transmission type liquid crystal display device of this embodiment, denoted by 70, a first lenticular lens sheet 47, which is of the same design as the lenticular lens sheet 17 shown in FIG. 7, is bonded to a first glass substrate 41. In this embodiment, however, a second lenticular lens 48, which is bonded to the surface of a second substrate 43 opposite to a liquid crystal layer 42, has cylindrical lenses having concave lens surfaces which are aligned vertically. The concave cylindrical lenses of the second lenticular lens sheet 48 are arranged at the same pitch as the line electrodes $45_1$ to $45_3$, i.e., the vertical pitch of the apertures. The second lenticular lens sheet 48 is bonded to the second glass substrate such that the ridges between adjacent concave lenses are aligned with the line electrodes $45_1$ to $45_3$.

The curvature of the cylindrical lenses of the first lenticular lens sheet 47 is smaller than that in the lenticular lens sheet 17 shown in FIG. 6. More specifically, the focal distance of the lens is greater than the distance between the lens surface of the first lenticular lens sheet 47 and the second lenticular lens sheet 48. On the other hand, the curvature of the concave lens of the second lenticular lens sheet is determined such that the linearly polarized lights, represented by light rays $\alpha_{40}$, $\alpha_{41}$ and $\beta_{49}$, partially overlap each other in an amount ranging between about 1/10 and ½, when projected on the screen 49.

In the light transmission type liquid crystal display apparatus 70 of the present invention, the incident linearly polarized lights are allowed to reach the second lenticular lens sheet 48 without being interrupted by the components $44_1$ to $44_3$ of the black matrix, wiring pattern of the line electrodes $45_1$ to $45_3$, TFTs and the auxiliary capacitors, thus offering the same advantages as those produced by the preceding embodiments.

Figure 12:
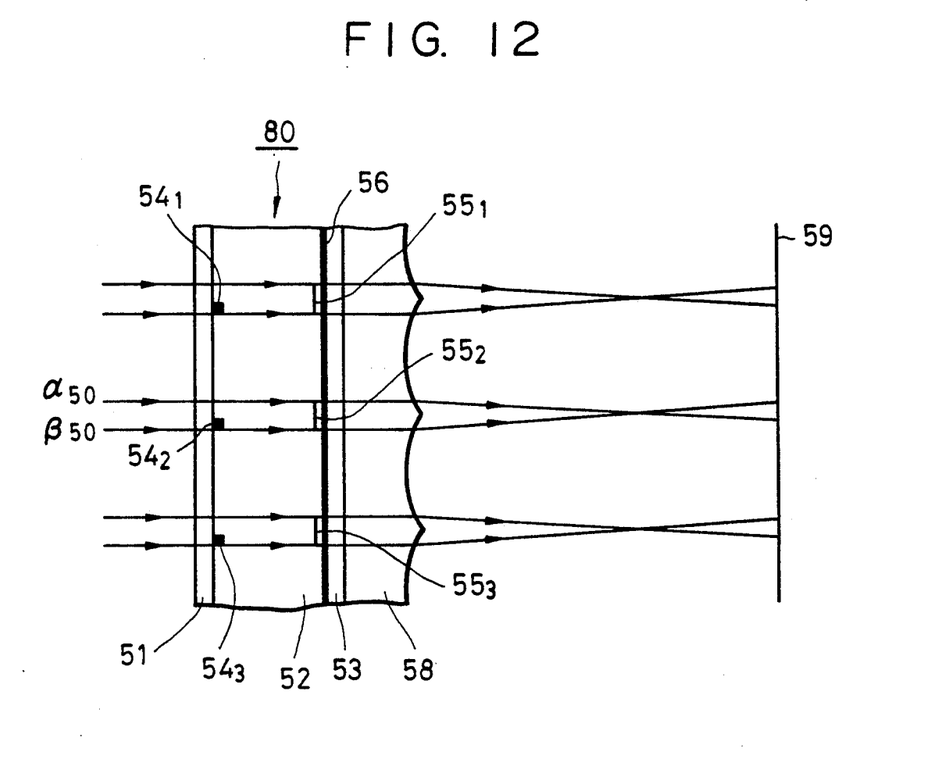
FIG. 12 is a sectional side elevational view of a still further embodiment of the light-transmission type liquid crystal display apparatus of the present invention, showing particularly a critical portion of the embodiment.

FIG. 12 is a sectional side elevational view of a light transmission type liquid crystal display apparatus as a further embodiment of the invention.

The liquid crystal display apparatus of this embodiment, denoted by 80, is similar to the embodiment shown in FIG. 11 but is devoid of the first lenticular lens sheet 47. In this embodiment, therefore, the linearly polarized incident lights are partially interrupted by the components such as the components $54_1$ to $54_3$ of the black matrix, Wiring pattern of the line electrodes $55_1$ to $55_3$, TFTs and the auxiliary capacitors. However, the linearly polarized lights $\alpha_{50}$ and $\beta_{50}$ impinging upon both vertical ends of the line electrode $55_2$ are refracted by the second lenticular lens sheet 58 so as to overlap each other in an amount of about 1/10 to ½ when projected on the screen 59.

Thus, the embodiment shown in FIG. 12 offers a practical advantage in that no regular dark region is generated in the displayed image, though the rate of utilization of the light is reduce due to interruption by the components such as the components $54_1$ to $54_3$ of the black matrix and so forth.

The first and the second lenticular lens sheets may be formed integrally with the first and second glass substrates, although these lenticular lens sheets in the described embodiments are formed separately and bonded to the glass substrates.

Thus, the light transmission type liquid crystal display apparatus of the present invention can be used in a projection type image receiving system of FIG. 13 in place of the light transmission type liquid crystal apparatus 106. The display apparatus of the invention can eliminate problems such as formation of the mosaic pattern and Moire by virtue of the increased aperture ratio, thus ensuring a higher quality of the image projected and displayed on the screen.

The construction of the projection type image receiving system shown in FIG. 13 is only illustrative. For instance, the polarizing plate 105 used in the above-mentioned system may be substituted by, for example, a beam splitter. In addition, the liquid crystal display apparatus may be of a tri-color type apparatus capable of displaying an image having three color components of red, green and blue.

As has been described, the liquid crystal display device of the present invention has a geometrical anisotropy of the apertures, and is provided with a lenticular lens sheet which is combined with the device such that the direction of axes of the cylindrical lens elements of the lenticular lens sheet coincide with the direction of the greater line aperture ratio, so that the rate of utilization of light is remarkably improved.

By virtue of the features set forth above, the present invention offers the following advantages.

The lights emitted from the liquid crystal display apparatus exhibits a distribution in which non-transmitted or shadow region is remarkably reduced or eliminated so as to provide a greater aperture ratio, by virtue of the fact that the first lenticular lens sheet provided on the light incident side serves to converge the parallel beams of the incident light to the areas of the respective apertures while the second lenticular lens sheet provided on the light-emitting side of the display apparatus converts the converged lights from the respective apertures into diffusing lights or parallel light beams.

The same effect is produced also when only one lenticular lens sheet is provided on the light-emitting side so as to change the incident parallel light beams into diffusing or diverging lights.

In addition, a projection type image receiving system incorporating the light transmission type liquid crystal display apparatus of the present invention can display images of high quality without suffering from generation of mosaic patterns and Moire.

What is claimed is:

1. A display apparatus, comprising:
   a display device including optical-switching portions each having a longitudinal dimension and a transverse dimension, with the longitudinal dimension and transverse dimension being different distances:
   and a lenticular lens sheet having a plurality of cylindrical lenses, with longitudinal axes, disposed on one side of said display device and oriented such that the axes extend in the direction of said optical switching portion dimension having the greater distance.

2. A display apparatus according to claim 1, wherein said plurality of optical-switching portions are disposed in an array such that the longitudinal dimensions and transverse dimensions are aligned.

3. A display apparatus comprising:
   a display device including a plurality of optical-switching portions each having a longitudinal dimension and a transverse dimension, with the longitudinal dimension and transverse dimension being different distances, said display device having means for controlling the quantity of emitted light with respect to a quantity of incident light by utilizing electro-optical response effect of a liquid crystal; and
   a lenticular lens sheet having a plurality of cylindrical lenses, with longitudinal axes, disposed on one side of said display device and oriented such that the axes extend in the direction of said optical-switching portion dimension having the greater distance.

4. A display apparatus according to claim 3, wherein said liquid crystal display apparatus is a nematic liquid crystal.

5. A display apparatus according to claim 3, wherein said liquid crystal is a ferroelectric liquid crystal.

6. A display apparatus according to claim 3, wherein said liquid crystal is a chiral smectic liquid crystal.

7. A display apparatus according to claim 3, wherein said plurality of optical-switching portions are disposed in an array such that the longitudinal dimensions and transverse dimensions are aligned.

8. A display apparatus, comprising:
   a display device including a plurality of optical-switching portions arranged in an array having longitudinal rows and transverse rows, with each optical-switching portion having a longitudinal dimension and a transverse dimension, with the longitudinal dimension and transverse dimension being different distances, said display device having means for controlling the quantity of emitted light with respect to a quantity of incident light by utilizing electro-optical response effect of a liquid crystal; and a lenticular lens sheet having a plurality of cylindrical lenses, with longitudinal axes, disposed on one side of said display device and oriented such that the axes extend in the direction of said optical-switching portion dimension having the greater distance and each said cylindrical lens corresponds to either one of the longitudinal and transverse rows and said optical-switching portions having a dimension of greater distance.

9. A display apparatus according to claim 8, wherein said liquid crystal is a nematic liquid crystal.

10. A display apparatus according to claim 8, wherein said liquid crystal is a ferroelectric liquid crystal.

11. A display apparatus according to claim 8, wherein said liquid crystal is a chiral smectic liquid crystal.

12. A display apparatus, comprising:
a display device including a plurality of optical-switching portions each having a longitudinal dimension and a transverse dimension, with the longitudinal dimension and transverse dimension being different distances, said display device having means for controlling a quantity of emitted light with respect to a quantity of incident light by utilizing electro-optical response effect of a liquid crystal;

a lenticular lens sheet having a plurality of cylindrical lenses, with longitudinal axes, disposed on one side of said display device and oriented such that the axes extend in the direction of said optical-switching portion dimension having the greater distance; and a light source for emitting a light to said optical switching portion.

13. A display apparatus according to claim 12, wherein said liquid crystal is a nematic liquid crystal.

14. A display apparatus according to claim 12, wherein said liquid crystal is a ferroelectric liquid crystal.

15. A display apparatus according to claim 12, wherein said liquid crystal is a chiral smectic liquid crystal.

16. A display apparatus, comprising:
a display device having first and second sides and including a plurality of optical-switching portions each having a longitudinal dimension and a transverse dimension, with the longitudinal dimension and transverse dimension being different distances, said display device having means for controlling a quantity of emitted light with respect to a quantity of incident light by utilizing electro-optical response effect of a liquid crystal;

a lenticular lens sheet having a plurality of cylindrical lenses, with longitudinal axes, disposed on said first side of said display device and oriented such that the axes extend in the direction of said optical-switching portion dimension having the greater distance; and reflecting means provided on said second side of said display device opposite from said lenticular lens sheet.

17. A display apparatus according to claim 16, wherein said liquid crystal is a nematic liquid crystal.

18. A display apparatus according to claim 16, wherein said liquid crystal is a ferroelectric liquid crystal.

19. A display apparatus according to claim 16, wherein said liquid crystal is a chiral smectic liquid crystal.

20. A display apparatus, comprising:
a display device having first and second sides and including a plurality of optical-switching portions arranged in an array having longitudinal rows and transverse rows, each optical-switching portion having a longitudinal dimension and a transverse dimension, with the longitudinal dimension and transverse dimension being different distances, said display device having means for controlling a quantity of emitted light with respect to a quantity of incident light by utilizing electro optical response effect of a liquid crystal;

a first lenticular lens sheet disposed on said first side of said display device, said first lenticular lens sheet having convex cylindrical lenses, with longitudinal direction of said optical-switching portion dimension having the greater distance and each said cylindrical lens corresponds to either one of the longitudinal and transverse rows of said optical switching portions having a dimension of greater distance; and a second lenticular lens sheet having a plurality of cylindrical convex lenses and provided on said second side of said display device opposite from said first lenticular lens sheet.

21. A display apparatus according to claim 20, wherein said second lenticular lens sheet is oriented in the same manner as said first lenticular lens sheet.

22. A display apparatus according to claim 20, wherein said liquid crystal is a nematic liquid crystal.

23. A display apparatus according to claim 20, wherein said liquid crystal is a ferroelectric liquid crystal.

24. A display apparatus according to claim 20, wherein said liquid crystal is a chiral smectic liquid crystal.

25. A display apparatus, comprising:
a display device having first and second sides and including a plurality of optical-switching portions arranged in an array having longitudinal rows and transverse rows, with each optical-switching portion having a longitudinal dimension and a transverse dimension, with the longitudinal dimension and transverse dimension being different distances, said display device having means for controlling a quantity of emitted light with respect to a quantity of incident light by utilizing electro-optical response effect of a liquid crystal;

a first lenticular lens sheet disposed on said first side of said display device, with said first lenticular lens sheet having convex cylindrical lenses, with longitudinal axes, and oriented such that the axes extend in the direction of said optical-switching portion dimension having the greater distance and each said cylindrical lens corresponds to either one of the longitudinal and transverse rows of said optical switching portions having a dimension of grater distance; and a second lenticular lens sheet having a plurality of cylindrical concave lenses and provided on said second side of said display device opposite from said first lenticular lens sheet.

26. A display apparatus according to claim 25, wherein said second lenticular lens sheet is oriented in the same manner ad said first lenticular lens sheet.

* * * * *

UNITED STATES PATENT AND TRADEMARK OFFICE
CERTIFICATE OF CORRECTION

PATENT NO. : 5,101,279
DATED : March 31, 1992
INVENTOR(S) : Katsumi Kurematsu, et al.

It is certified that error appears in the above-identified patent and that said Letters Patent is hereby corrected as shown below:

COLUMN 2:

Line 9, "o" should read --of--.
   Line 11, "lens," should read --lenses,--.
   Line 30, "display 6" should read --display 60--.

COLUMN 3:

Line 17, "crystal liquid" should read --crystal display device 1 has liquid crystal cells of a nematic liquid--.

COLUMN 4:

Line 14, "enters" should read --centers--.

COLUMN 5:

Line 36, "$\alpha_2$ or" should read --$\alpha_2$ (or--.

COLUMN 6:

Line 4, "U" should be deleted.
   Line 24, "form" should read --from--.

COLUMN 8:

Line 18, "b" should read --be--.

UNITED STATES PATENT AND TRADEMARK OFFICE
CERTIFICATE OF CORRECTION

PATENT NO. : 5,101,279

DATED : March 31, 1992

INVENTOR(S) : Katsumi Kurematsu, et al.

It is certified that error appears in the above-identified patent and that said Letters Patent is hereby corrected as shown below:

Line 53, "second lenticular lens 48," should read --second lenticular lens sheet 48--.

COLUMN 12:

Line 20, "longitudinal" should read --longitudinal axes, and oriented such that the axes extend in the--.
Line 59, "grater" should read --greater--.
Line 67, "ad" should read --as--.

Signed and Sealed this

Twentieth Day of July, 1993

Attest:

MICHAEL K. KIRK

*Attesting Officer*     *Acting Commissioner of Patents and Trademarks*